United States Patent [19]
Kleinberg et al.

[11] Patent Number: 4,766,384
[45] Date of Patent: Aug. 23, 1988

[54] WELL LOGGING APPARATUS FOR DETERMINING DIP, AZIMUTH, AND INVADED ZONE CONDUCTIVITY

[75] Inventors: Robert L. Kleinberg, Ridgefield, Conn.; Brian Clark, Missouri City, Tex.; Weng C. Chew, Champaign, Ill.; David Mariani, Darien, Conn.

[73] Assignee: Schlumberger Technology Corp., New York, N.Y.

[21] Appl. No.: 876,514

[22] Filed: Jun. 20, 1986

[51] Int. Cl.$^4$ .......................... G01V 3/18; G01V 3/28; H01Q 13/10
[52] U.S. Cl. .................................... 324/339; 324/338; 343/767
[58] Field of Search ........................ 324/338, 339, 341; 343/746, 767–771, 789, 812–814, 820–822, 853, 855, 856, 867, 904–906

[56] References Cited

U.S. PATENT DOCUMENTS

| | | | |
|---|---|---|---|
| 2,431,124 | 11/1947 | Kees et al. | 343/789 |
| 4,052,662 | 10/1977 | Rau | 343/767 X |
| 4,054,876 | 10/1977 | Hoople | 343/789 |
| 4,383,220 | 5/1983 | Baldwin | 324/338 |
| 4,422,043 | 12/1983 | Meador | 324/338 |
| 4,511,842 | 4/1985 | Moran et al. | 324/338 |
| 4,529,938 | 7/1985 | Hagiwara | 324/339 |
| 4,571,592 | 2/1986 | Justice | 343/767 |
| 4,651,100 | 3/1987 | Janes | 324/338 |
| 4,652,829 | 3/1987 | Safinya | 324/338 |

FOREIGN PATENT DOCUMENTS 2156527 10/1985 United Kingdom ............... 324/338

OTHER PUBLICATIONS

Serov et al.; Probe for the Measurement of Magnetic Fields with Sub-Nanosecond Resolution, Review of Scientific Instrum., vol. 46, No. 7, Jul. 1975, pp. 886–888.

Primary Examiner—Gerard R. Strecker
Attorney, Agent, or Firm—Keith Smith; Peter Lee; Martin Novack

[57] ABSTRACT

A well logging apparatus is disclosed which employs slot antennas having a plurality of conductive probes traversing the slot. Also disclosed are a logging apparatus having electrically isolated antenna probes and a logging apparatus with an improved circuit for generating and applying a reference signal used in phase detection.

36 Claims, 12 Drawing Sheets

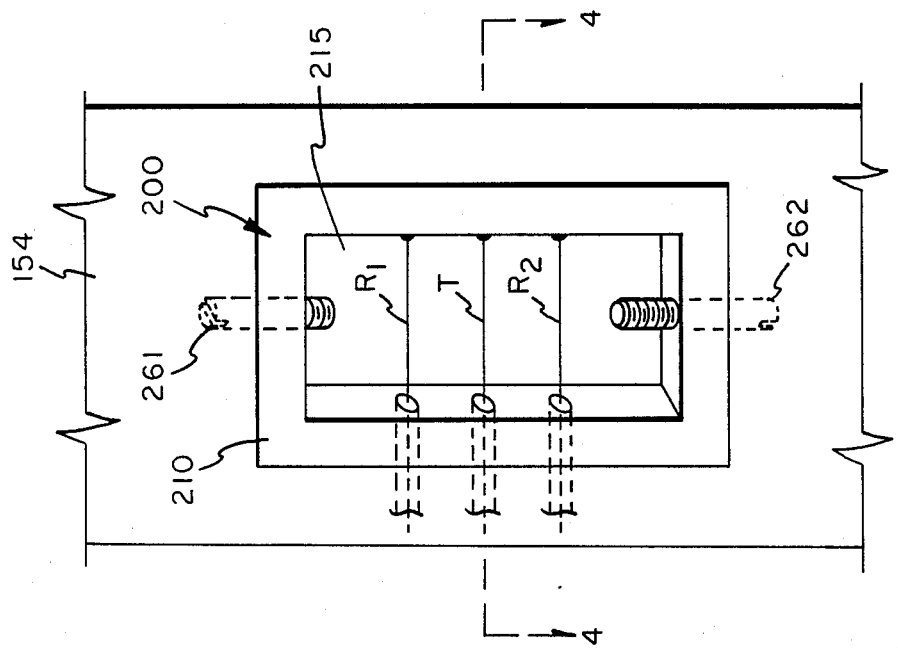
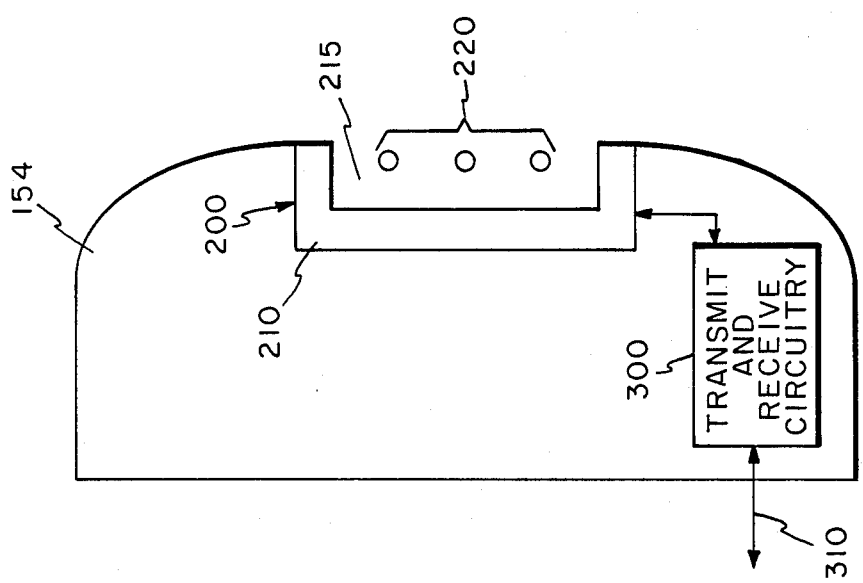
Fig. 3
Fig. 2

WELL LOGGING APPARATUS FOR DETERMINING DIP, AZIMUTH, AND INVADED ZONE CONDUCTIVITY

FIELD OF INVENTION

This invention relates to well logging of earth formations traversed by a borehole and, more particularly, to an apparatus for determining, with high resolution, formation characteristics such as dip and azimuth, and invaded zone conductivity.

BACKGROUND OF THE INVENTION

There have been previously developed various techniques for obtaining measurements of formation conductivity with a relatively high resolution; i.e., with the ability to resolve conductivity, or changes in conductivity, over small distance variations in the formations. Most of these techniques are implemented with logging devices having pad-mounted electrodes or antennas. A review of existing techniques is set forth in copending U.S. patent application Ser. Nos. 616,323, now U.S. Pat. No. 4,712,070, 616,325, 616,326, and 616,327, all filed May 31, 1984, assigned to the same assignee as the present application, and hereinafter collectively referred to as the "copending prior applications". Some of these techniques, and the devices which employ them, will now be reviewed.

A valuable aid in the exploration for oil and gas is the dipmeter log, which provides positive structural and stratigraphic information for both exploration and development drilling programs. Advances in dipmeter tool design, machine computerization, and interpretation methods make it possible to recognize such features as structural dip, faults, unconformities, bars, channels, and reefs. In addition, the direction of sedimentation and of pinchouts can be estimated. When combined with data from other wells, dipmeter information helps to establish the overall structural and stratigraphic picture of the area under study.

The focused current type of dipmeter has been particularly well received by the wireline logging industry for use in logging boreholes drilled with conductive drilling fluids. Focused current dipmeter tools employ at least three pads and commonly four, each of which comprises one or more electrodes for emitting a focused current beam into the adjacent formation. The current flow at each electrode is proportional to the conductivity of the adjacent formation. Focused current dipmeters are described in U.S. Pat. No. 3,060,373 issued Oct. 23, 1962 to Doll; U.S. Pat. No. 4,251,773, issued Feb. 17, 1981 to Cailliau, et al.; and U.S. Pat. No. 4,344,271 issued June 8, 1982 to Clavier. These are able to achieve good vertical resolution at reasonable logging speeds, the microresistivity sensors used on some of these tools being capable of resolution to as fine as 0.2 inch.

The great amount of data acquired by dipmeters, and especially the high resolution focused current dipmeters, is advantageously exploited by the use of computers. For example, suitable computer implemented correlation techniques are described in U.S. Pat. No. 4,348,748, issued Sept. 7, 1982 to Clavier, et al., and U.S. Pat. No. 4,355,357, issued Oct. 19, 1982 to Chan. Improved dip determinations often can be obtained by use of other computer-implemented techniques, such as that described in U.S. patent application Ser. No. 383,159, filed May 28, 1982, now U.S. Pat. No. 4,453,219.

Electrical dipmeters, including the focused current type, are not altogether satisfactory for use in boreholes which have been drilled with a nonconductive fluid such as air or an oil-based mud. Techniques based on the principle of induction logging have been proposed for measuring dip by the use of either mandrel-mounted coils or pad-mounted coils. In conventional induction logging, such as disclosed in U.S. Pat. No. 2,582,314, issued Jan. 15, 1952 to Doll, oscillating magnetic fields formed by one or more energized induction coils on a mandrel induce currents in the formation around the borehole. These currents in turn contribute to a voltage induced in one or more receiver coils through a secondary magnetic field. The voltage component of the received signal that is in phase with respect to the transmitter current, known as the R-signal, is approximately proportional to formation conductivity.

Induction techniques using pad-mounted coils have been described, for example, in U.S. Pat. Nos. 3,388,323, 3,539,911, and 4,019,126. These techniques suffer various disadvantages, as described in the referenced copending prior applications.

In the referenced copending prior applications there are disclosed pad-mounted microinduction antenna arrangements for obtaining improved measurements in, for example, dipmeter logging devices and $R_{xo}$ logging devices. The antennas disclosed therein include loops and half-loops in various arrangements. Circuitry for obtaining output signals from the receivers, generally representative of conductivity or conductivity contrasts in the formations, are also disclosed. In an embodiment set forth in the prior applications, the receivers are connected in series opposition through a subtractive network such as a balun (a "balanced/unbalanced transformer"), which enables the direct mutual inductance to be nulled. The output of the subtractive network is coupled to an input of a phasesensitive detector, the reference input to which is a reference signal obtained from the transmitter. The reference signal is used as phase reference in determining the conductivity-induced component in the receivers, and in rejecting nuisance signals including the X-signal.

It is among the objects of this invention to provide improvements in microinduction antennas and logging systems. It is also among the objects of the invention to provide an improved apparatus for obtaining a reference signal for use in obtaining the conductivity-induced signals in the receivers of microinduction and induction logging systems.

SUMMARY OF THE INVENTION

The present invention is directed to a well logging apparatus for investigating electrical characteristics of formations surrounding a borehole. In a form of the invention a body is adapted for engagement with the wall of the borehole. Typically, the body will comprise a pad member, for example a pad of a dipmeter logging device. An antenna set is mounted in the body and comprises an electrically conductive base having a slot therein which opens toward the borehole wall. A plurality of conductive probes traverse the slot and respectively constitute a transmitting antenna and at least one, and preferably two receiving antennas. The slot is preferably filled with a dielectric material. Means are provided for energizing the transmitting antenna probe by coupling an energizing signal to said transmitting antenna probe. Means coupled to said at least one receiver probe are also provided for generating an output signal dependent on the electromotive force acting on the receiver probe, said output signal being indicative of an electrical characteristic of the formations. In a disclosed embodiment, two receiver probes are employed, and are coupled in series opposition. A circuit, to be described, is utilized to obtain a signal representative of the difference in electromotive force received by the receiving antennas, and this signal is representative of either the conductivity of the formation or the change in the conductivity of the formation.

The use of a slot with two or more antenna probes therein has a number of advantages over prior art antenna sets. In addition to compactness and sturdiness, the antenna sets hereof are easy to manufacture, and can be readily tuned and adjusted for desirable levels of flux interception by the receiver probes as described hereinbelow. The metal base of the slot can form an integral part of a pad housing or be readily maintained as a modular component.

In an embodiment hereof, each of the probes comprises an extension of the center conductor of a coaxial cable, and each of the probes is terminated by shorting to a side of the slot. In another embodiment, the receiver probes are electrically floating with respect to the base, and the receiver probes are coupled together after passing through the slot. This embodiment has the advantage of avoiding a path through ground between the transmitter and the receivers, thereby reducing a source of spurious coupling. In a further form of this embodiment, the transmitter probe is also floating with respect to the base.

Another aspect of the present invention involves an improved circuit for obtaining a reference signal that is useful in determining the real component of the electronic difference signal from the receivers. In accordance with this embodiment of the invention, a phase-sensitive detector is provided and has a measurement signal input and a reference signal input, the phase-sensitive detector being operative to determine the magnitude of the measurement signal input that is in a given phase relationship with the reference signal input. A balanced/unbalanced ("balun") transformer circuit is provided and comprises a transformer primary winding across which are connected the uncoupled respective ends of the first and second receiving antennas. The primary winding has a center tap coupled to the reference signal input of the phase-sensitive detector. The transformer balun circuit has a secondary winding coupled to the measurement signal input of the phase-sensitive detector. The output of the phase-sensitive detector is indicative of the real component of the difference in electromotive force acting on the first and second receivers. In accordance with a feature of this embodiment of the invention, an impedance is coupled between the common coupling of the first and second receiving antennas and a reference potential. The impedance has a value selected to adjust the phase of the reference signal to be in a predetermined phase relationship with the real component of the measurement signal.

In a further embodiment of the invention a transmitting antenna is mounted in a wall-engaging face of a pad member, and a receiver array is also mounted in the pad member, spaced from the transmitting antenna. The receiver array comprises a conductive base having a slot therein which opens toward the borehole wall, and a plurality of spaced parallel conductive probes traversing the slot.

Further features and advantages of the invention will become more readily apparent from the following detailed description when taken in conjunction with the accompanying drawings.

BRIEF DESCRIPTION OF THE DRAWINGS

FIG. 2 is a cross section through one of the pads of FIG. 1, showing a microinduction antenna set in accordance with an embodiment of the invention.

FIG. 3 is a front facing view, partially in broken-away form, of an antenna set in a pad, in accordance with an embodiment of the invention.

DESCRIPTION OF THE PREFERRED EMBODIMENTS

Figure 1:
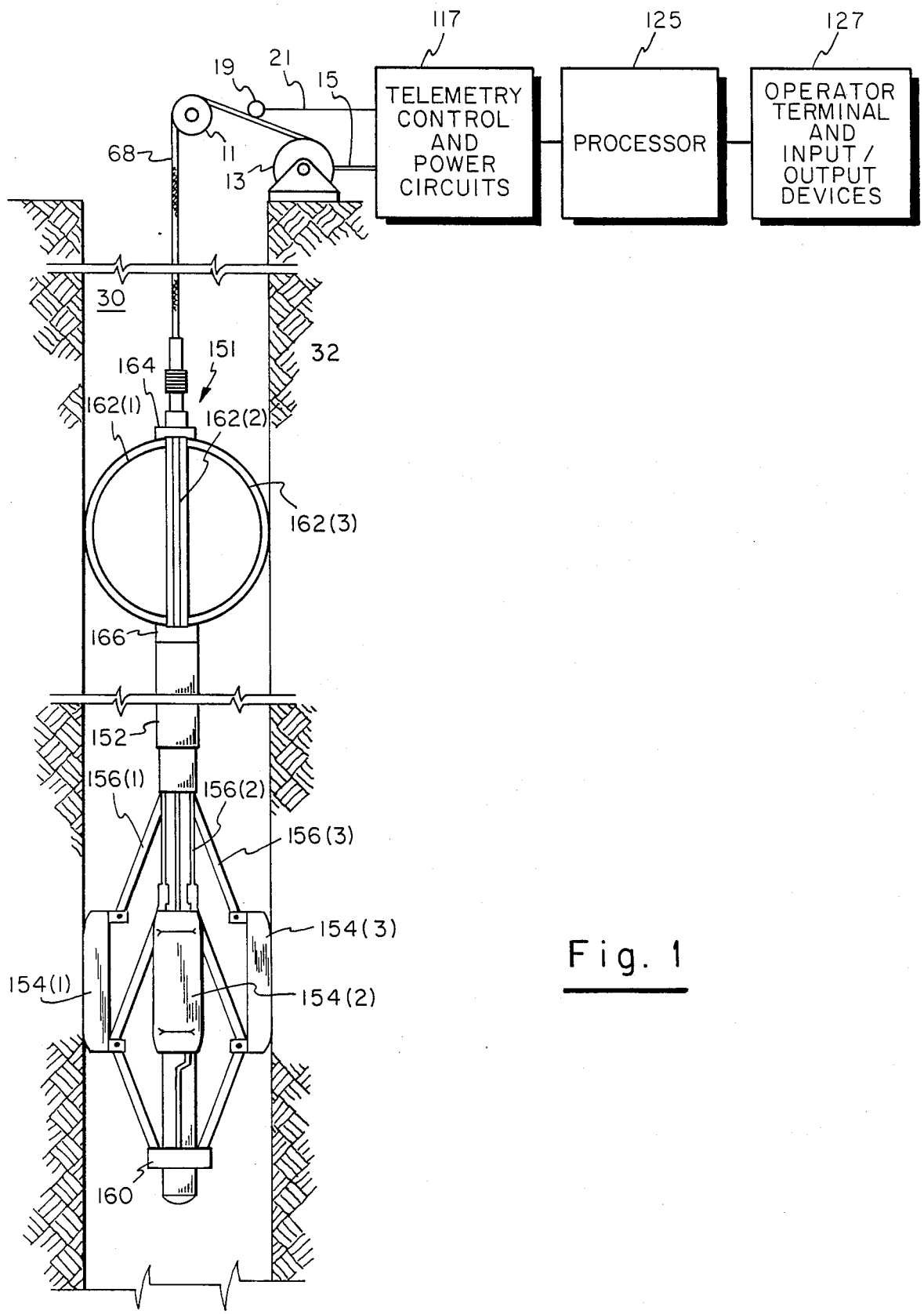
FIG. 1 is a diagram, partially in block form, of a type of a well logging apparatus which can include the improvements in accordance with the invention.

The invention will initially be described as used in an improved apparatus for investigating structural and stratigraphic dip. In the embodiment of FIG. 1 a dipmeter tool 151 is shown as being suspended on a multiconductor cable 68 in a borehole 30 which traverses earth formations 32. The tool is typically, although not necessarily, used in a borehole drilled with non-conductive drilling fluid.

The gross mechanical structure of the tool may be as described in the abovereferenced copending U.S. patent applications. In particular, the tool 151 comprises an elongated central support member 152 adapted for movement through the borehole 30. The elongated member 152 supports four substantially identical pads 154(1), 154(2), 154(3) and 154(4) (hidden), which are urged against the wall of the borehole 30 by respective arm mechanisms 156(1), 156(2), 156(3) and 156(4) (hidden) in association with a collar 160. Collar 160 is mounted on the elongated support member 152, and slides on the member 152 to allow for expansion and contraction of the arm mechanisms 156(1)–156(4). The tool 151 may also include a suitable centering guide assembly coupled to the upper end of the elongated support member 152. When utilized, the centering guide assembly includes flexible spring arms 162(1), 162(2), 162(3) and 162(4) (hidden), which are connected to suitable collars 164 and 166. One of the collars 164 and 166 is secured to the support member 152. The other collar is mounted on the support member 152, and slides on the member 152 to allow for expansion and contraction of the spring arms 162(1)–162(4). The centering guide assembly comprising springs 162(1)–162(4) cooperates with pads 154(1)–154(4) and associated arm mechanisms 156(1)–156(4) to maintain the tool 151 centered in the borehole 30.

The armored multiconductor cable 68 couples the tool 151 to surface apparatus. The surface apparatus includes a sheave 11 over which the multiconductor cable 68 passes to a suitable drum and winch mechanism 13, for raising and lowering tool 151 through borehole 30. Electrical connection between the cable 68 and telemetry, control and power circuits 117 is made through a suitable multielement slip ring and brush contact assembly (not shown) and cable 15. The depth of the tool is determined by the use of a suitable measuring wheel mechanism 19, which is also connected to the telemetry, control and power circuits 117 by cable 21. Other surface instrumentation typically includes a processor 125 connected to the telemetry, control and power circuits 117, and operator terminal and input/output devices 127 connected to the processor 125. The uphole circuitry instrumentation does not, per se, involve the inventive features hereof, although some of the circuit functions described herein could theoretically be performed uphole.

FIG. 2 shows a pad 154 having an antenna set 200 therein. The antenna set 200 has a metal base 210 with a slot 215 therein, and a plurality of conductive probes 220, to be described, traversing the slot. Transmitting and receiving circuitry 300, to be described, is coupled to the antenna set. The circuitry 300 is coupled to the sonde body via one or more cables 310.

Slot antennas have been disclosed for use in a logging apparatus, such as in copending U.S. application Ser. No. 687,071, filed Dec.28, 1984, now U.S. Pat. No. 4,689,572 and assigned to the same assignee as the present application. In that application, where operation is indicated as preferably being in the range over 100 MHz, with an example describing operation at 1100 MHz, each slot is illustrated as having a single associated probe, and each such slot is utilized as a single antenna, there being, for example, a transmitting slot antenna and two receiving slot antennas. In the present embodiment of the invention an antenna set, comprising a transmitter and a receiver pair, is included in the slot, in the form of a plurality of conductive probes traversing the slot.

Figure 4:
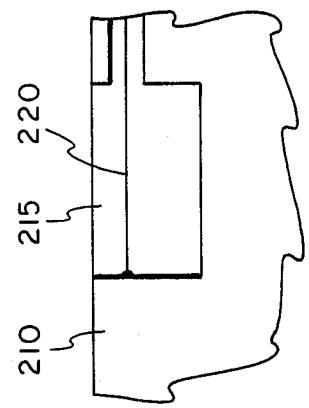
FIG. 4 is a cross-sectional view, as taken through the section defined by arrows 4—4 of FIG. 3, of the antenna set of FIG. 3.
Figure 5A:
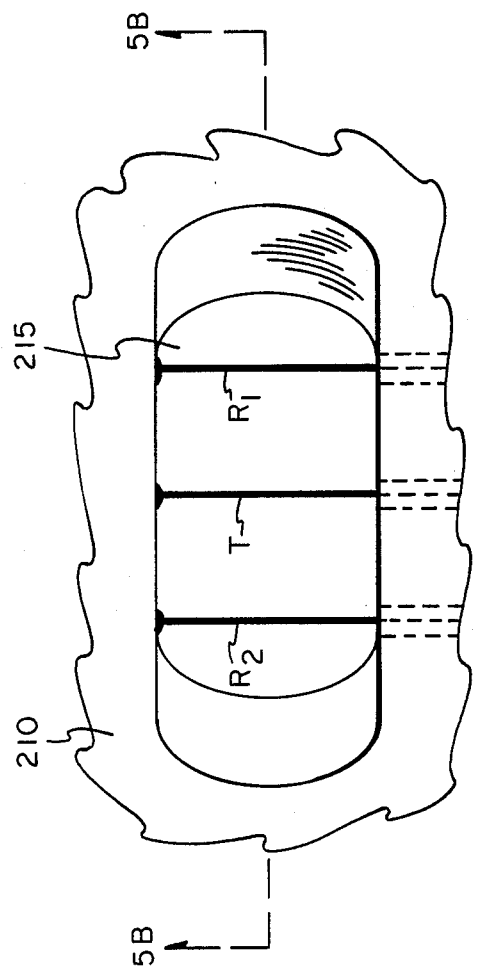
FIG. 5A is a plan view of an example of the configuration of a slot as used in embodiments of the present invention.
Figure 5B:
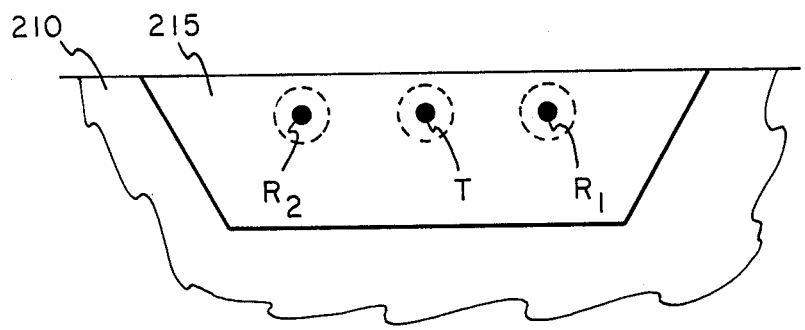
FIG. 5B is a sectional view of the slot of FIG. 5A, as taken through a section defined by arrows 5B—5B of FIG. 5A.

Referring to FIGS. 3 and 4 there are shown further views of an antenna set in accordance with an embodiment of the invention. The slot 215 has a generally rectangularly shaped opening in the illustrated embodiment, but can alternatively be of other shapes, for example oval or rounded rectangular or slanted rectangular as shown in FIGS. 5A and 5B. The slot 215 opens toward the borehole wall and the plurality of conductive probes 220 (FIG. 2) traversing the slot constitute a transmitting antenna T and receiving antennas $R_1$ and $R_2$. In the embodiment of FIGS. 2-4, as well as in FIGS. 5A and 5B, the transmitting antenna probe T is between and parallel to the receiving antenna probes $R_1$ and $R_2$, and all three probes are in a direction that is perpendicular to the axis of the borehole. As shown in FIG. 3, each of the probes can comprise an extension of the center conductor of a coaxial cable, and each such conductor terminates, e.g. by shorting, on one side of the slot. The remainder of the slot can be filled with a dielectric material, for example, a ceramic or an oil retained by a plastic cover plate (not shown). As shown in FIG. 3, a pair of tuning screws 261 and 262 can be employed, and extend into the slot by an adjustable amount in order to achieve receiver balance (by slightly modifying the slot shape and volume). At microinduction logging frequencies, for example in the range about 1 MHz to 100 MHz, the dielectric constant of the dielectric material is generally not critical. Also, in this operating frequency range, the slot dimensions can be within a relatively wide range, for example, length and width in the range 10 mm by 20 mm to 50 mm by 100 mm, and depth of the order of 10 mm.

Figure 6:
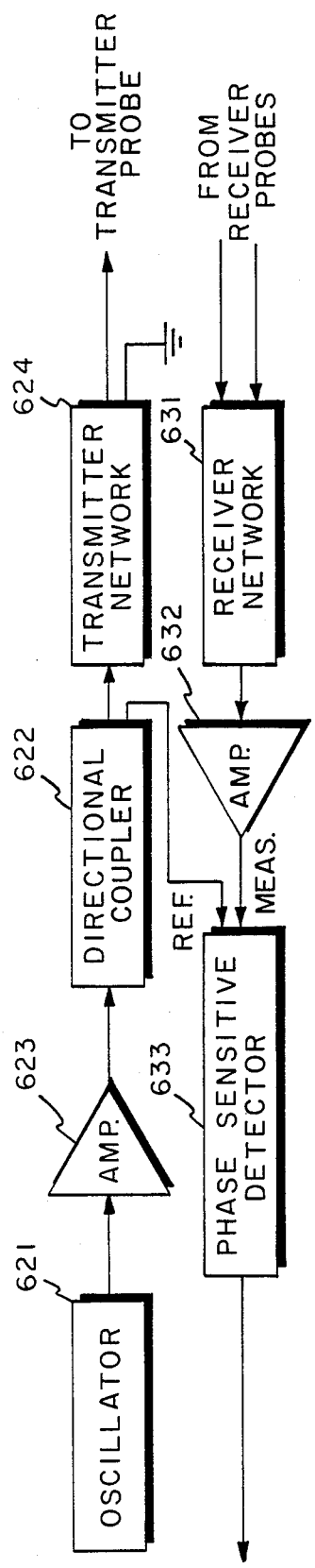
FIG. 6 is a block diagram of transmitter and receiver circuitry as utilized in the referenced prior copending applications, and can be used in conjunction with antenna sets of the present invention.

The preferred system circuitry hereof will be described further hereinbelow. Initially, however, operation can be visualized in conjunction with circuitry as shown in FIG. 6, and described for example in the referenced copending prior applications. Briefly, an oscillator 621 has its output coupled through an amplifier 623 and a directional coupler 622 to a network 624, which may be a transmitter balun. In this case, the balun output is coupled between the center coax feeding into probe T and the base 210, which is at ground reference potential. The receiver probes $R_1$ and $R_2$ are coupled in series opposition to network 631 (e.g. another balun), the output of which is amplified by amplifier 632 and coupled to the measurement input of a phase sensitive detector 633. The reference input to phase sensitive detector 633 is derived, in the FIG. 6 configuration, from directional coupler 622. [This reference input may be coupled to the phase sensitive detector via a phase shifter (not shown), or a phase shifter may be included in the function of phase sensitive detector 633.] The output of detector 633 (in the case of receivers arranged to intercept the same amount of magnetic flux in the presence of a homogeneous formation) is a signal representative of the contrast in formation conductivity as seen by the respective receivers. As described in the prior copending applications, antennas arranged in this way provide a gradiometric reading of the formation; i.e., a reading of conductivity contrast as the logging device moves, for example over a bed boundary or other conductivity discontinuity. This is the situation for the receivers as shown in the balanced arrangement of FIGS. 3–5, and in this case there is a substantially zero output of detector 633 when the antenna array "sees" a uniform formation.

Figure 7:
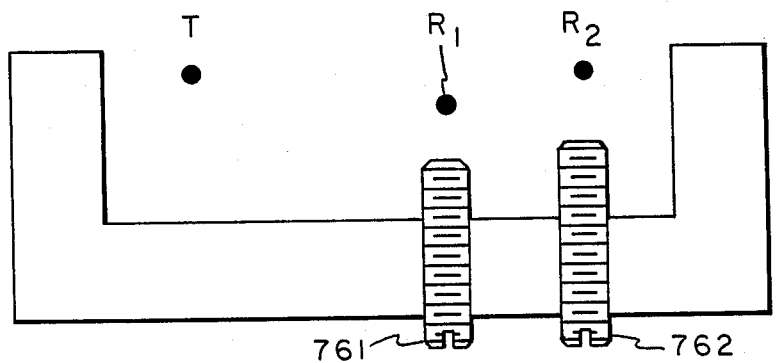
FIG. 7 is a cross-sectional view of an antenna set in accordance with another embodiment of the invention.

As described in the referenced copending prior applications, when the microinduction receiving antennas are arranged to intercept respectively different strengths of flux, in the presence of a uniform formation, the conductivity of the formation will determine the absolute difference in electromotive force induced in the receivers. Accordingly, the difference can be used to obtain an absolute conductivity measurement, such as formation invaded zone conductivity or resistivity, $R_{xo}$. In the present invention, variations in the placement of receiver probes and/or the shape of the slot can be used in achieving an antenna set that provides absolute conductivity measurements. In FIG. 7, a transmitter probe T and adjacent receiver probes $R_1$ and $R_2$, spaced from the transmitter probe, are provided. In this case the transmitter probe is at one end of the slot and the adjacent receiver probes are at the other end of the slot. The net signal coupled into the receiver pair in the absence of formation (i.e., the direct mutual coupling) should be nulled. One way to achieve this is to position the receiver probes such that the magnetic flux threading receiver $R_1$ is the same as that threading receiver $R_2$. In the FIG. 7 embodiment, this is done by having the probe for receiver $R_1$, which is closer to the transmitter and would therefore normally sense more flux than the far receiver $R_2$, positioned closer to the bottom of the slot than is the receiver $R_2$. Adjustable tuning can be provided in this configuration, for example, by using tuning screws 761 and 762 that respectively oppose receiver $R_1$ and $R_2$. With this balance achieved, the difference in flux sensed by the receivers will be dependent upon the field strength which, in turn, depends upon the conductivity of the formations.

Figure 8:
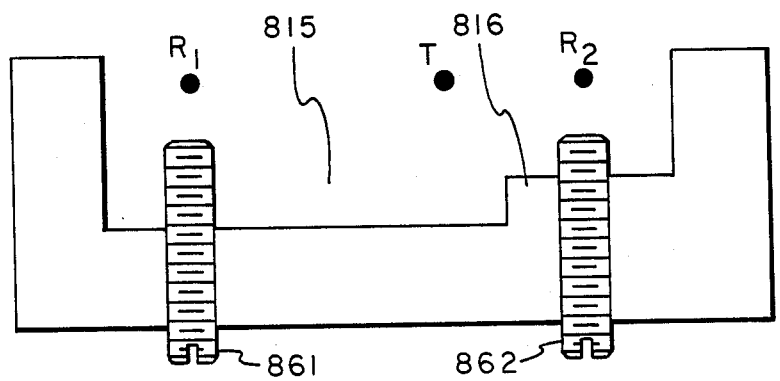
FIG. 8 is a cross-sectional view of an antenna set in accordance with another embodiment of the invention.

Another arrangement which can be utilized for absolute measurement of conductivity is illustrated in FIG. 8. In this embodiment, the transmitter probe T is between receiver probes $R_1$ and $R_2$, but with receiver probe $R_1$ being spaced further from the transmitter than is the other receiver probe $R_2$. In this case, the direct mutual coupling is balanced by having the closer receiver nearer to the bottom of the slot. This could be achieved, for example, in the manner previously described; i.e., by having the receiver probe in question ($R_2$ in this case) positioned closer to the bottom of the slot. In FIG. 8, however, this is achieved by employing a step 816 in the bottom of the slot 815. Tuning screws 861 and 862, under the respective receivers $R_1$ and $R_2$, can again be used for adjustable tuning of the antenna array.

Figure 9:
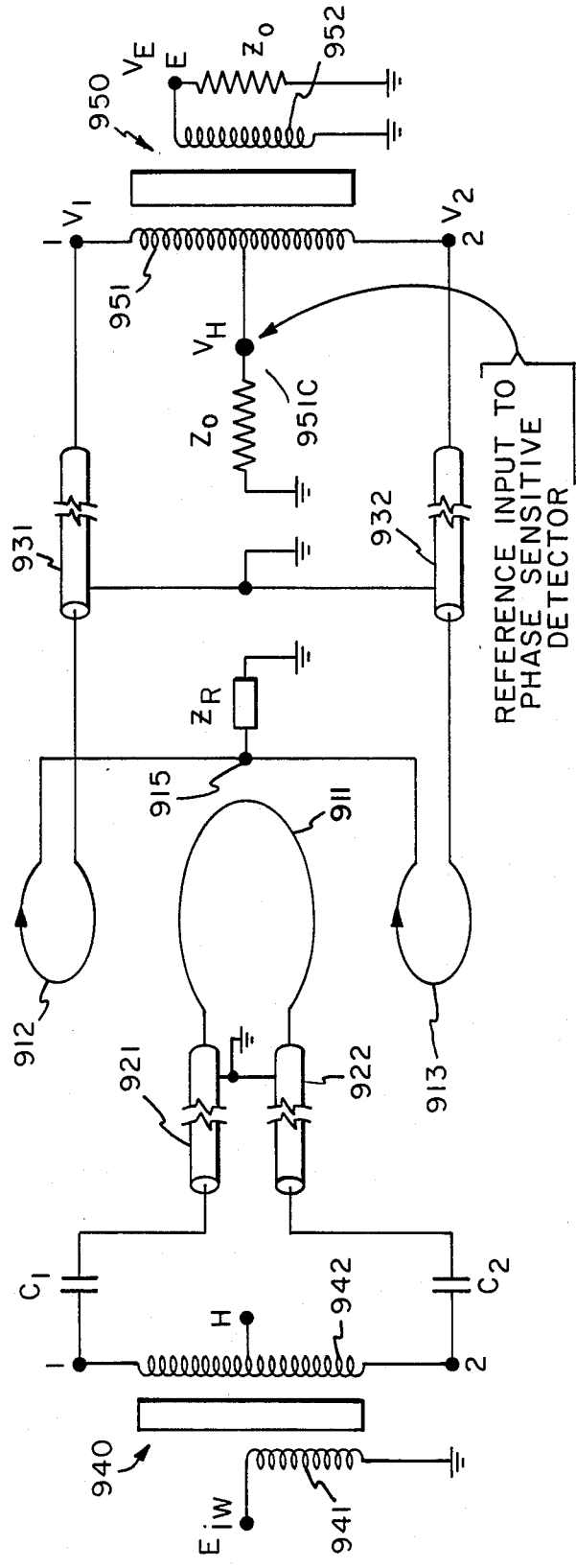
FIG. 9 is a schematic diagram of transmitter and receiver circuitry for an induction or microinduction system which includes improvements in accordance with another form of the invention.

An aspect of the present invention pertains to the obtainment and use of a reference signal to improve logging measurements taken with microinduction or induction sensors. These sensors may be, for example, of the type illustrated in the referenced copending prior applications or of the type set forth herein. In FIG. 9 a transmitter loop 911 and receiver loops 912 and 913 are generally of the type of microinduction antennas shown in said referenced copending prior applications, or the antenna probes hereof. The receiver loops are coupled together in series opposition, with each of these loops having one side coupled in common at a terminal 915. The transmitter coil is shown as being coupled to circuitry (to be described) via coaxial cables 921, 922 and the receiver coils as being coupled to circuitry (to be described) via coaxial cables 931, 932, with all the coax outer conductors being coupled to ground reference potential. In this embodiment, as well as other embodiments hereof, electrostatic shields (not shown) may be placed around individual coils, such as to reduce undesired electroquasistatic coupling. All such shields would be coupled to ground reference potential.

In the embodiment of FIG. 9 the receivers are coupled to a balanced/unbalanced transformer 950 (a "balun") in an arrangement wherein the non-common sides of the receiver coils are respectively coupled to the ends 1 and 2 of transformer primary winding 951. A center tap 951C of the primary winding (voltage $V_H$) is the input to the reference channel of a phase sensitive detector (e.g. 633 of FIG. 6) having an input impedance to ground of $Z_0$. The secondary winding 952 (voltage $V_E$) is coupled between ground and the input of the phase sensitive detector (again, e.g. 633 of FIG. 6), also having an impedance to ground of $Z_0$. In accordance with a feature hereof, the common connection of the receiver coils (terminal 915) is coupled to ground reference potential via an impedance $Z_R$, selected as described hereinbelow.

The transmitter coil is also coupled to a balun, 940, in which capacitors C1 and C2 are shown as being representative of impedance matching. Other components may also be utilized for impedance matching. The energizing signal, designated $E_{in}$, is coupled to the transformer primary 941. The voltage at a center tap of the secondary winding 942 is designated H. In terms of the FIG. 6 arrangement, the signal $E_{in}$ of FIG. 9 can be viewed as the input to transmitter network 624 (which comprises the balun circuit of FIG. 9 in this case), and the receiver circuitry of FIG. 9 serves the function of the receiver network 631 of FIG. 6, in addition to providing the reference signal, as described.

The magnetic field produced by the current in the transmitter induces electromagnetic forces in the receiver pair through the action of three distinct mechanisms, described briefly in (1,) (2a) and (2b,) and (3,) as follows:

(1) There is a direct coupling through the mutual inductance between transmitter and receiver pair. This is present even in the absence of a formation and produces a voltage in each of the receiver probes that is very large compared to any signal due to the presence of a formation in front of the slot. However, the electromagnetically symmetric placement of receivers with respect to the transmitter ensures that substantially equal direct mutual EMFs are developed in each of the receiver probes; when the probe voltages are differenced, these EMFs cancel. In actual devices this cancellation is never perfect and a residual direct mutual signal will remain. This residual signal is 90 degrees out of phase with respect to the transmitter current.

(2a) Microinduction sensors represented, for example, by those shown in FIGS. 7 and 8 have the feature that the two receiver probes are placed in electromagnetic symmetry with respect to the transmitter, but not with respect to a formation that is located in front of the slot. For such sensors, a second signal component will be present when the formation is homogeneous. This component is linearly proportional to the conductivity of the formation, and is the signal of most interest in many well logging applications such as dipmeter measurements. This component of the receiver pair voltage is in phase with the transmitter current.

(2b) Microinduction sensors represented, for example, by those shown in FIGS. 5A and 5B have the feature that the two receiver probes are placed in electromagnetic symmetry with respect both to the transmitter and to a formation that is located in front of the slot. In the presence of a homogeneous formation, the EMFs induced in the two receiver probes will cancel and there will be no net received signal. In the presence of an inhomogeneous formation, the net voltage developed across the pair will be linearly proportional to the gradient of the formation electrical conductivity. Again, this signal is of interest in many well logging applications such as dipmeter measurements. This component of the receiver pair voltage is in phase with the transmitter current.

(3) Microinduction sensors of the type described in (2a) and (2b) above are also sensitive to formation dielectric constant and to formation dielectric constant gradient, respectively. The net voltage induced in the receiver pair is 90 degrees out of phase with respect to the transmitter current in both cases.

For the purposes of the present analysis, the signal that is in phase with respect to the transmitter current is termed the R-signal. The direct mutual signal described under (1) above is termed the X-signal.

Let the electromotive forces induced separately in the two receivers be $U_1$ and $U_2$, and let $$U_1 = U_{1R} + jU_{1X} \text{ and } U_2 = U_{2R} + jU_{2X}$$

The R-component is always much smaller than the X-component in a single receiver, and can only be measured when the X-signal is accurately cancelled. With the receivers wired in series opposition, the voltage across the receiver balun ports (FIG. 9) labelled "1" and "2", $(V_1 - V_2)$, will be proportional to $(U_1 - U_2)$. This voltage appears at balun port "E", $(V_E = V_1 - V_2)$. In a perfect sensor, the X-components are exactly cancelled, and $V_E$ depends only on the R-components. In a practical (imperfect) sensor, some residual X-signal will be present in $V_E$. To distinguish the R-signal from the residual X-signal, phase sensitive detection can be used if the phase of the X-signal or the R-signal is known. In the present embodiment the voltage $V_H$ at the center tap of the receiver balun primary winding 951 provides the needed reference signal. Since $V_H$ is proportional to $V_1 + V_2$, and since the X-signal is vastly larger than the R-signal in a single receiver, $V_H$ will be substantially proportional to $U_{1X} + U_{2X}$. Also, as will become clear, the circuit impedance can be controlled to enhance the accuracy of the reference signal at $V_H$.

Figure 10:
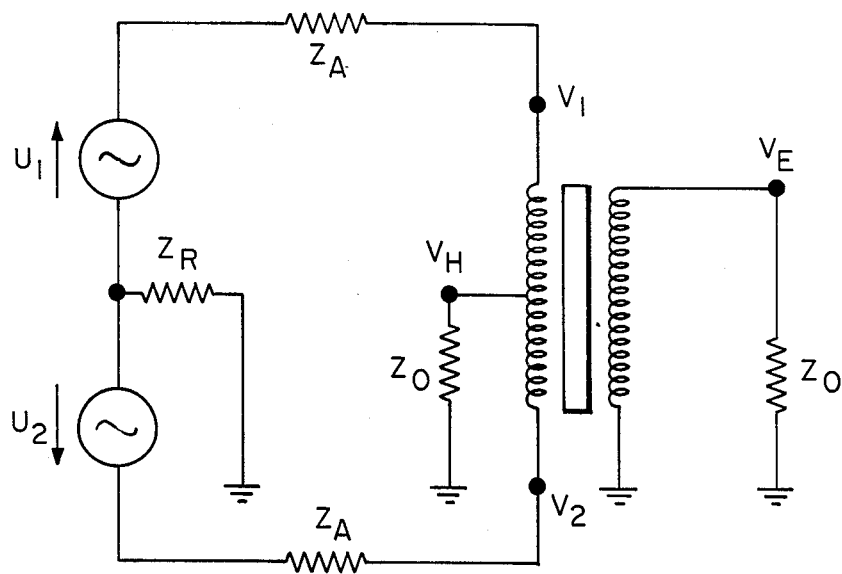
FIG. 10 is an equivalent circuit diagram of the receiver balun circuit of the FIG. 9 embodiment.

To further analyze the FIG. 9 configuration, FIG. 10 shows a simplified circuit diagram for the receivers. An individual receiver is represented as a voltage generator in series with the receiver self-impedance ($Z_A$), which is primarily inductive. As in FIG. 9, the center point of the receiving pair is tied to ground through an impedance $Z_R$. $Z_R$ would normally be mostly the capacitance between the receivers and ground. However, as described further hereinbelow, $Z_R$ can be advantageously changed by placing appropriate impedance (resistance and/or reactance) at this point. The two output ports of the balun are shown as being terminated in the characteristic impedance of the measurements electronics $Z_O$. Practical baluns have the property that, for example, when $Z_O = 50$ ohms, the impedances to ground at $V_1$ and $V_2$ are also 50 ohms.

Figure 11:
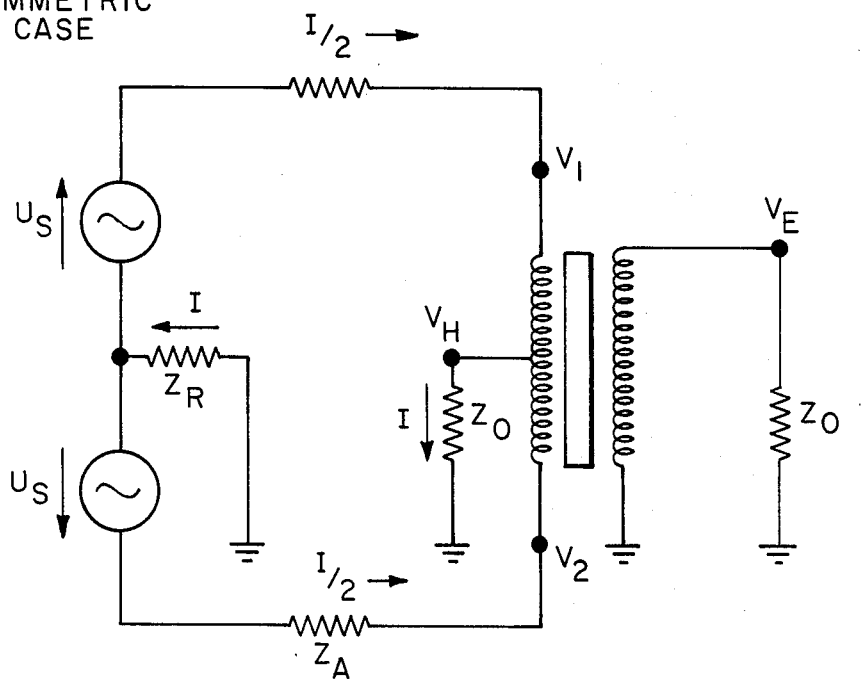
FIG. 11 is an equivalent circuit for the symmetric case analysis of the FIG. 10 circuit.
Figure 12:
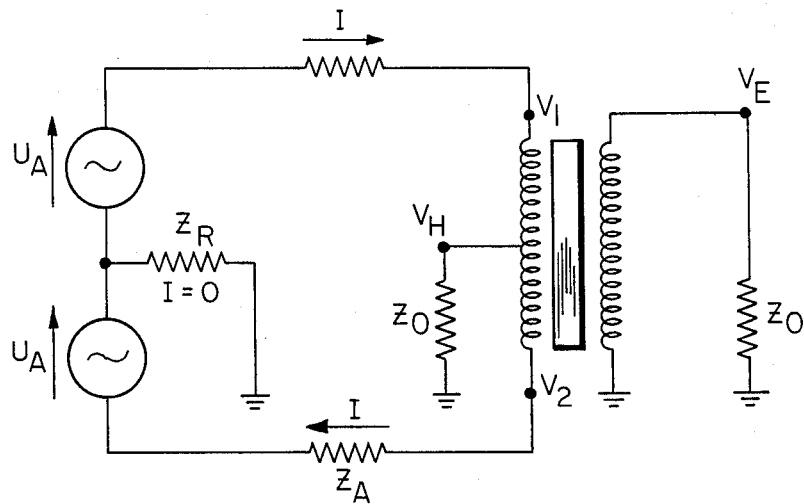
FIG. 12 is an equivalent circuit for the anti-symmetric case analysis of the FIG. 10 circuit.

The circuit of FIG. 10 can be analyzed by considering symmetric and antisymmetric cases for the electromotive forces. Let $$U_S = (U_1 + U_2)/2 \text{ and } U_A = (U_1 - U_2)/2,$$

where the subscripts S and A mean symmetric and anti-symmetric, respectively. FIG. 11 illustrates the symmetric case and FIG. 12 illustrates the anti-symmetric case. Combining these two leads to the solution to the general case:

$$V_E = [(U_{1R} - U_{2R}) + j(U_{1X} - U_{2X})] \frac{Z_O}{Z_O + Z_A},$$

$$V_H = [(U_{1R} + U_{2R}) + j(U_{1X} + U_{2X})] \frac{Z_O}{Z_O + Z_A + 2Z_R}.$$

Since the X-signal dominates $V_H$, to good accuracy we have $$V_H = j(U_{1X} + U_{2X}) \frac{Z_O}{Z_O + Z_A + 2Z_R}.$$

The phases of $V_H$ and $V_E$ depend on the impedances in the above equations. The ratio of these two impedance factors is $$\zeta = [1 + 2Z_R/(Z_O + Z_A)].$$

Figure 13:
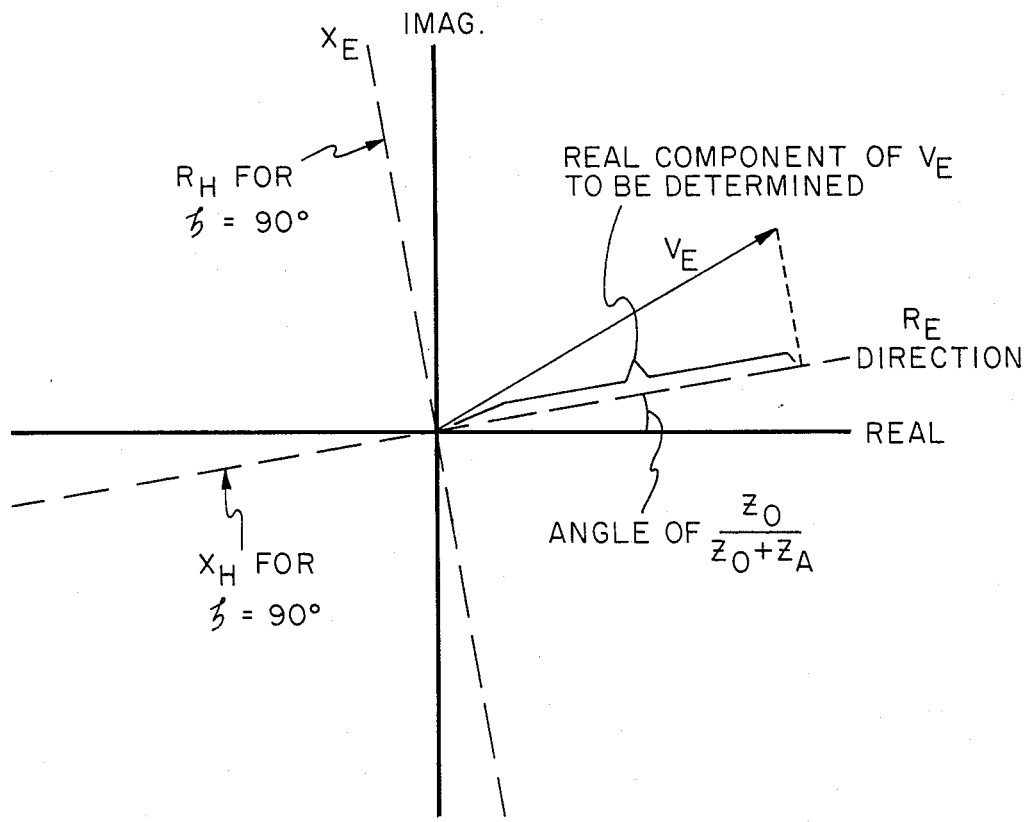
FIG. 13 is a vector diagram showing the direction of the measurement signal and related directions for a reference signal as can be obtained using a feature of the invention.

By appropriately choosing $Z_R$, it is possible to control the magnitude and phase of this ratio, and hence, to control the magnitude and phase of $V_H$ with respect to $V_E$. The preferred choice for $Z_R$ is the one which gives $\zeta$ an angle of 90 degrees, so that $V_H$ (which is primarily $X_H$) points along the R-direction. Thus $V_H$ will provide a phase magnitude reference for analyzing $V_E$. The diagram of FIG. 13 illustrates the angle of $V_E$, with respect to the real component of the signal at E (i.e., $R_E$), and shows $X_H$ as lying in the $R_E$ direction when $Z_R$ is appropriately chosen.

Figure 14A:
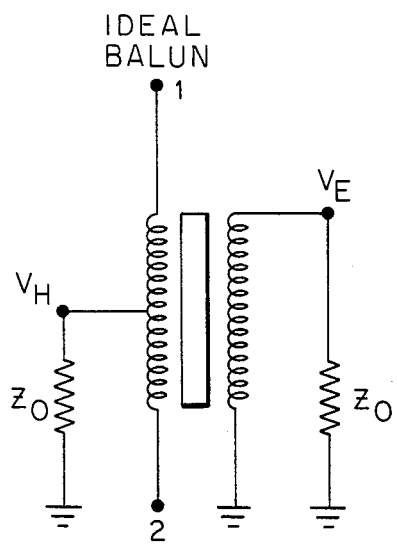
FIGS. 14A and 14B are circuit representations of an ideal balun circuit and a "real" balun circuit, as used in analyzing a feature of the present invention.
Figure 14B:
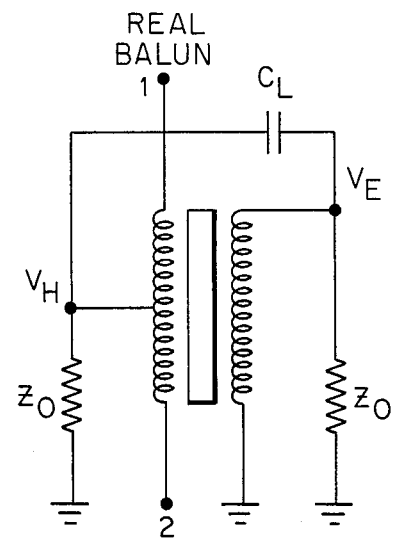

Choosing the resistor R so that $V_H$ points in the R-direction direction has an added advantage in that it reduces the residual direct mutual signal in $V_E$. Real baluns have finite isolation between the "E" and "H" ports, and some signal present in the "H" channel will leak into the "E" channel. This leakage is a result of capacitance between the primary and the secondary windings of the balun. A simple circuit model for this leakage path is shown in FIGS. 14A and 14B, which respectively show the cases for an ideal balun and a "real" balun. [It will be understood that actual balun circuits may be more complex and, for example, can contain additional transformers and other impedance matching means, as is known in the art.] If the leakage capacitance is $C_L$, and $Z_o \ll 1/j\omega C_L$, then $V_E$ can be written as:

$$V_E = (V_1 - V_2) + j\omega C_L Z_O V_H$$

or

-continued $$V_E = [(U_{1R} - U_{2R}) + j(U_{1X} - U_{2X})] \frac{Z_O}{Z_O + Z_A} +$$

$$j(U_{1X} + U_{2X}) \frac{jC_L Z_O^2}{Z_O + Z_A + 2Z_R}.$$

If the phase of $\zeta$ is chosen to be 90 degrees, then $V_H$ will point in the R-direction, and the leakage of $V_H$ into the "E" channel is purely reactive since it undergoes a 90 degree phase shift in the leakage path. Hence, the leakage does not affect the R-signal in $V_E$. Since the leakage appears in the X-signal in $V_E$, it can be balanced by a deliberately introduced direct mutual signal. This can be effected by tuning the receiver positions or by other means.

There are a number of advantages in using $V_H$ as the reference signal. $V_H$ is easily obtained without great modification to standard receiver balun circuitry. Further, $V_H$ is derived from the same balun as $V_E$, so that the phase accuracy will be high. Any drifts caused by instability in the transmitter circuitry affect both $V_E$ and $V_H$ equally, and are therefore not too harmful. Such drifts in the transmitter are likely if the transmitter is tuned for high efficiency. Also, $V_H$ is continuously available and has a strong amplitude, which enhances its use as a reference signal for a phase sensitive detector.

In an illustrative example, a microinduction system as in FIG. 9 was operated at 25 MHz and had the following measured impedances: $Z_O = 50$ ohms, $Z_A = j\omega L = j14$ ohms, and $$Z_R = \frac{R}{1 + j\omega CR},$$

where $\omega$ is the angular frequency, L is a receiver inductance, C is the capacitance between the receivers and ground, and R is a fixed resistor placed between the midpoint of the receivers and ground. R and C add in parallel. C was determined to be 8.4 picofarads. Several different resistors R were placed in the circuit and the resulting effects on $V_H$ and $V_E$ were noted. With the resistor in place, the positions of the receivers were adjusted to give a minimum $V_E$ signal in air. The residual $V_E$ signal and $V_H$ were recorded. Then, a metal plate was placed close to the sensor. In this case, $V_E$ pointed in the X-direction. The following table shows the experimental and theoretical values (as determined using the above relationships) for the phase difference between $V_E$ and $V_H$ for various values of R.

| R(Ω) | <$V_E$ | <$V_H$ | ΔφEXP | ΔφTHEORY |
|---|---|---|---|---|
| ∞ | 27° | 134° | −107° | −106° |
| 10K | 31° | 131° | −100° | −101° |
| 5K | 31° | 125° | −94° | −95° |
| 3.33K | 30° | 119° | −89° | −91° |
| 2K | 25° | 103° | −78° | −83° |
| 0.5K | 27° | 69° | −42° | −46° |

$V_E$: measured with metal plane near sensor
$V_H$: measured with air surrounding sensor For this particular sensor, $V_H$ is about 90 degrees to the X-signal when R=3.33 k Ω. Hence, $V_H$ provides a phase reference as well as a magnitude reference, for determining the R-component of $V_E$ with the proper choice for the resistor R.

Figure 15:
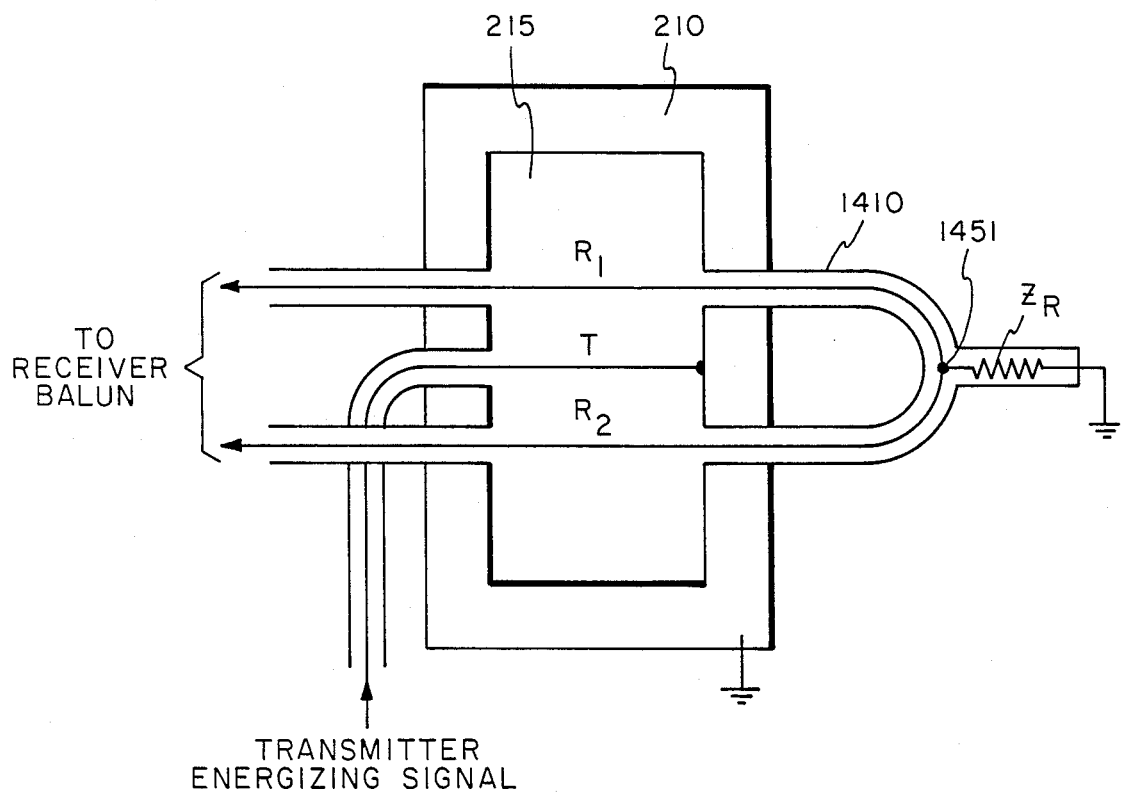
FIG. 15 is a cross-sectional view of an embodiment of an antenna set and associated feed lines and circuit portion in accordance with another embodiment of the invention.

Referring to FIG. 15, there is shown a further embodiment of an antenna array in accordance with the invention. In this embodiment, the metal base 210 and slot 215 may be of the same general configurations as previously described in conjunction with FIGS. 2-5, 7 and 8. The transmitter T (which is central of the receivers, in this example), is connected as in the FIG. 3 embodiment, i.e., with the transmitter probe terminating by shorting to the side of the slot after traversing the slot. In the present embodiment, however, the receiver probes, after traversing the slot, are not shorted to the metal base at the side of the slot but, rather, pass through an outer conductor 1410 (which may be the outer conductor of a piece of coaxial cable), and are joined together at a common terminal 1451. The terminal 1451 is coupled to ground reference potential (which, in this case, is the potential of the metal base 210) via the impedance $Z_R$, which is preferably selected in accordance with the principles previously set forth. Accordingly, the receivers are coupled together and are floating with respect to the base 210. The transmitter and the receivers can be coupled to circuitry (not shown) as previously described (e.g. FIG. 6 or, more preferably, FIG. 9) for determining the desired signal component from the receiver signals.

Figure 16:
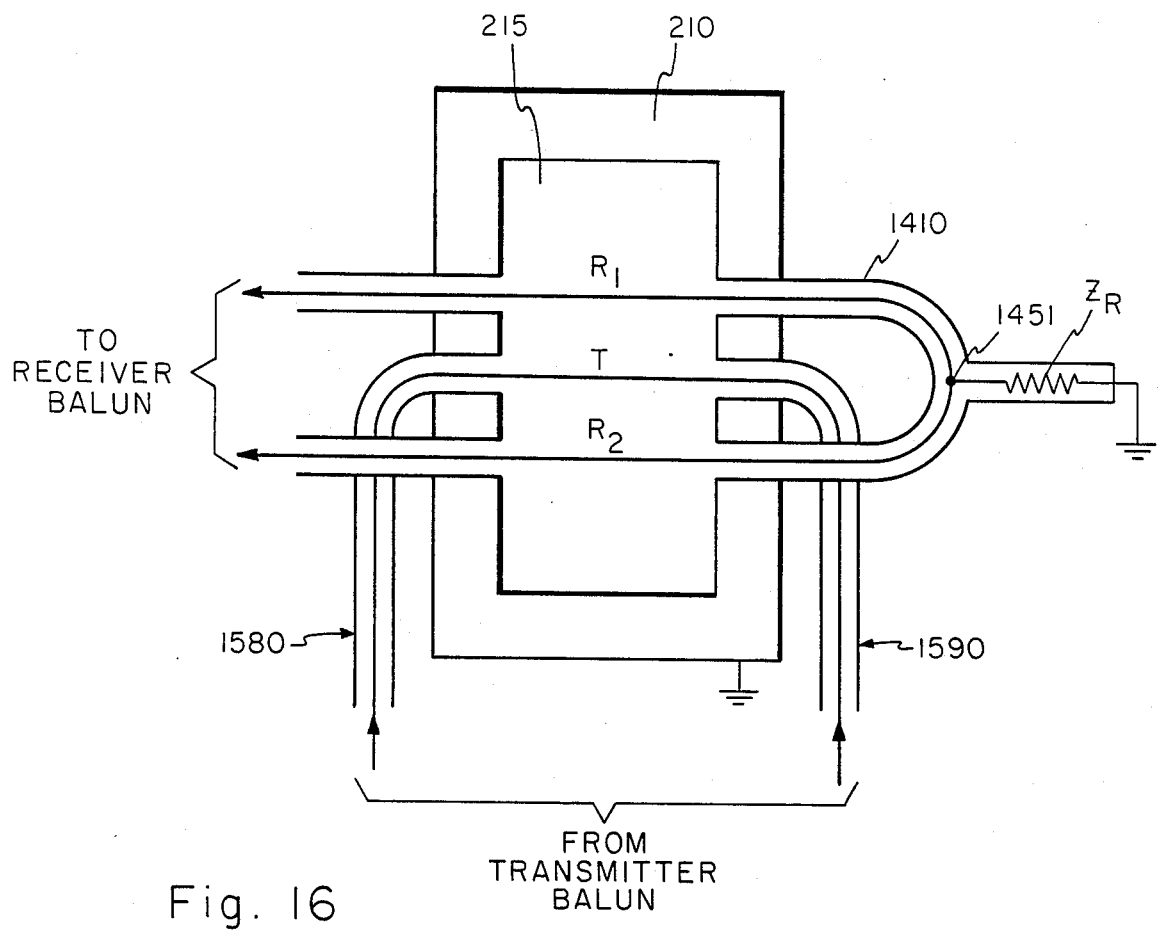
FIG. 16 is a cross-sectional view of an antenna set, feed lines, and circuit portion in accordance with still another embodiment of the present invention.

In the embodiment of FIG. 16, the receivers are floating as in the FIG. 15 embodiment, and in this case the transmitter probe T is also floating. In particular, the transmitter probe T is the center conductor of coaxial cable 1580, 1590 on both sides of the slot 215, said center conductor being coupled, for example, to the respective ends of the transformer in the transmitter balun 940 of FIG. 9. It will be understood that the other arrangements of antenna probes in the slot, such as are shown in FIGS. 7 and 8 for example, or other embodiments hereof, can also have their transmitter and/or receiver probes in a floating configuration.

Figure 17:
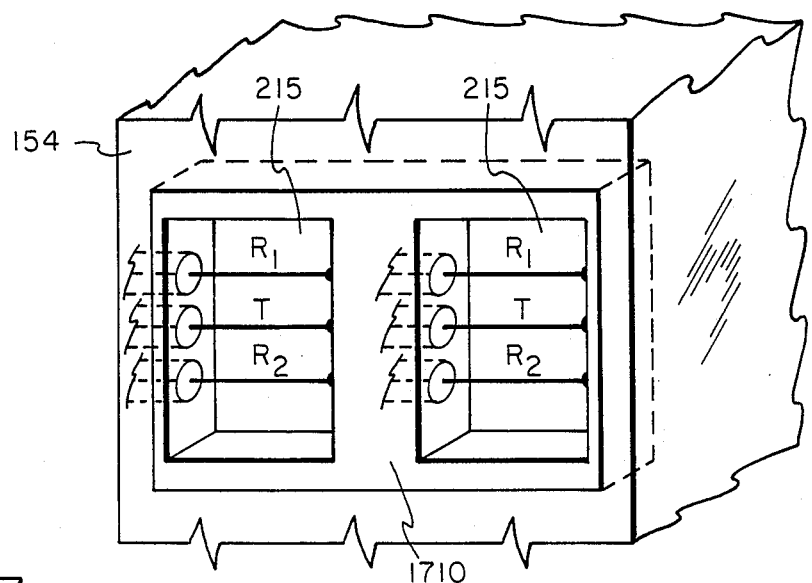
FIG. 17 is a diagram of a further embodiment of the invention wherein two side-by-side antenna sets are provided.

Referring to FIG. 17, there is shown an embodiment of the invention wherein a pair of slots 215 and associated probes are disposed, side-by-side on the same pad member 154. The slots are in a common metal base 1710. The inherently compact nature of the antenna sets hereof facilitates the use of two or more antenna sets in this manner. In a dipmeter application, for example, high resolution conductivity contrasts can be obtained by determining conductivity from these side-by-side antenna sets. The antenna sets of FIG. 17 can be operated alternately using a single transmit/receive system that is switched between the antenna sets, or can be operated simultaneously at different characteristic operating frequencies.

Figure 18:
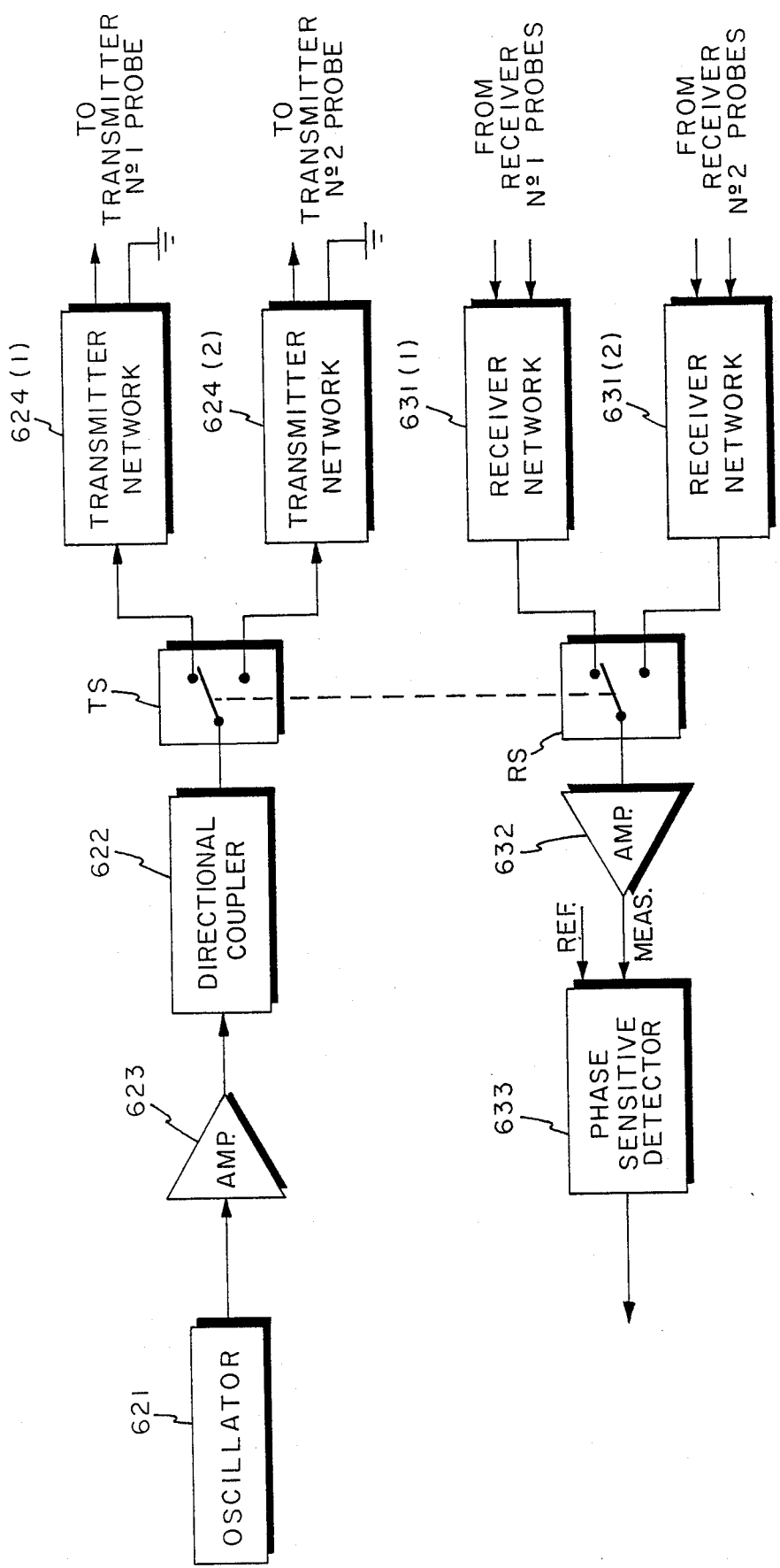
FIG. 18 is a block diagram of transmitter and receiver circuitry which can be employed for aternating operation of two antenna sets.

FIG. 18 is a block diagram of circuitry which can be employed with the FIG. 17 embodiment in an arrangement of alternate operation of the antenna sets. The oscillator 621, directional coupler 622, amplifiers 623 and 632, and phase sensitive detector 633 may correspond to the elements of like reference numerals in FIG. 6. In this embodiment, however, there are two of transmitter network 621 [designated as transmitter networks 624(1) and 624(2)] which are coupled to the respective transmitter probes of FIG. 17 (for example), and there are two of receiver network 631 [designated as receiver networks 631(1) and 631(2)] which are coupled to the respective receiver probe pairs of FIG. 17 (for example). The switches TS and RS operate together to first activate transmitter 624(1) while causing coupling of receiver network 631(1) output to the phase sensitive detector, and then to activate transmitter 624(2) while causing coupling of receiver network 631(2) output to the phase sensitive detector, and so on. In another configuration, where different frequencies of operation are empolyed, two separate circuits of the type shown in FIG. 6, for example, can be provided and coupled to the two arrays of FIG. 17, for example, for simultaneous operation at different operating frequencies.

Figure 19:
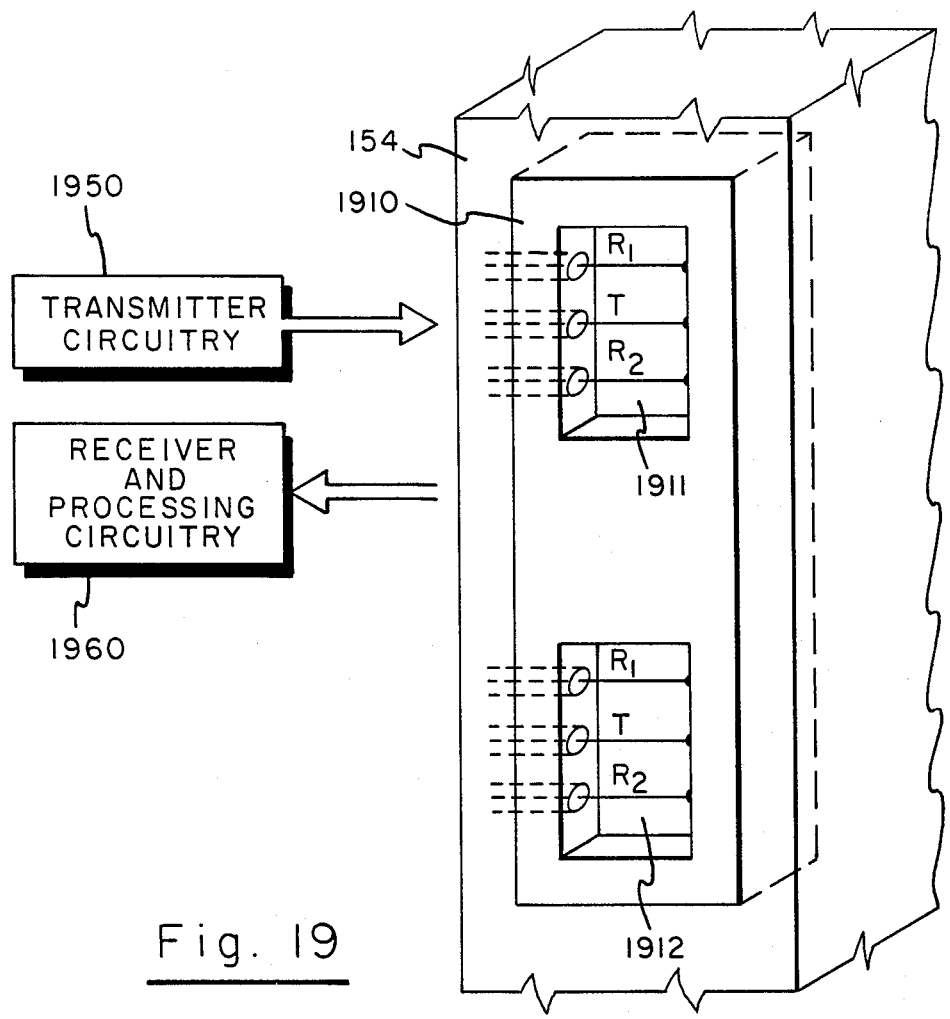
FIG. 19 is a diagram of a further embodiment of the invention wherein two antenna sets one-above-another are employed.

Referring to FIG. 19 there is shown another form of the invention in which a pair of slots 1911 and 1912 are disposed one-above-another on the same pad member 154. The slots are in a common metal base 1910. Again, the inherently compact nature of the antenna sets hereof facilitates the use of two or more antenna sets in this manner. The antennas can be operated in the manner previously described, such as to obtain conductivity measurements or in a dipmeter application. Alternatively, the antennas sets can be operated both as individual microinduction antenna sets and, with appropriate switching, as antenna components in an electromagnetic propagation logging device. In the copending U.S. patent application Ser. No. 876,944, now U.S. Pat. No. 4,704,581, of B. Clark, filed of even date herewith and assigned to the same assignee as the present application, there is disclosed an electromagnetic logging apparatus wherein a transmitting antenna and spaced receiving antennas are mounted in a pad, each of the antennas comprising a slot antenna having a probe that traverses the slot in a direction perpendicular to the borehole axis and also perpendicular to a borehole radius. [The parent application of said Ser. No. 876,944, i.e. U.S. Ser. No. 687,071 of B. Clark, filed Dec. 28, 1984, now U.S. Pat. No. 4,689,572 discloses an electromagnetic logging apparatus with slot antennas, wherein the probe in each slot is parallel to the axis of the borehole.] In the embodiment of FIG. 19, the transmitter probe of the array in the lower slot 1912 can be utilized in conjunction with the receiver probes of the array in the upper slot 1911. For "borehole compensated" operation, the transmitter probe of the lower array can also be utilized (alternately with the other transmitter) in conjunction with the receiver probes of the upper array. The circuitry for measuring the phase and attenuation, and obtaining conductivity and permittivity therefrom, can be as disclosed in the above referenced copending Clark applications. In the Figure, the transmitter circuitry is designated as 1950, and the receiver and processing circuitry is designated as 1960. Also, it will be understood that all three (or more, if desired) probes in a slot can be used as receiving elements, or that two or more slots each having a plurality of probes used as receiving elements can be employed in conjunction with a separate transmitter.

Figure 20:
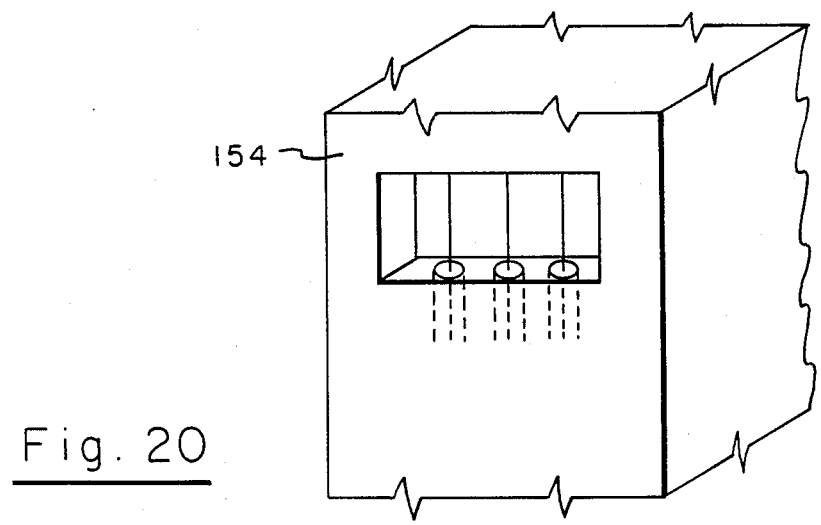
FIG. 20 is a diagram of another antenna set as used in accordance with another embodiment of the invention.

Referring to FIG. 20, there is shown another embodiment of an antenna set for use in accordance with the principles hereof. In this embodiment the slot and probes are oriented in the pad 154 such that the probes are parallel to the axis of the borehole. With this configuration the gradient of conductivity in the azimuthal direction can be obtained, for example. Also, the slot and probes can be arranged (as in FIGS. 7 and 8, for example), to obtain absolute conductivity measurements. Further, two or more of the FIG. 20 slots per pad can be implemented, either side-by-side or one-above-another, as previously described.

Figure 21:
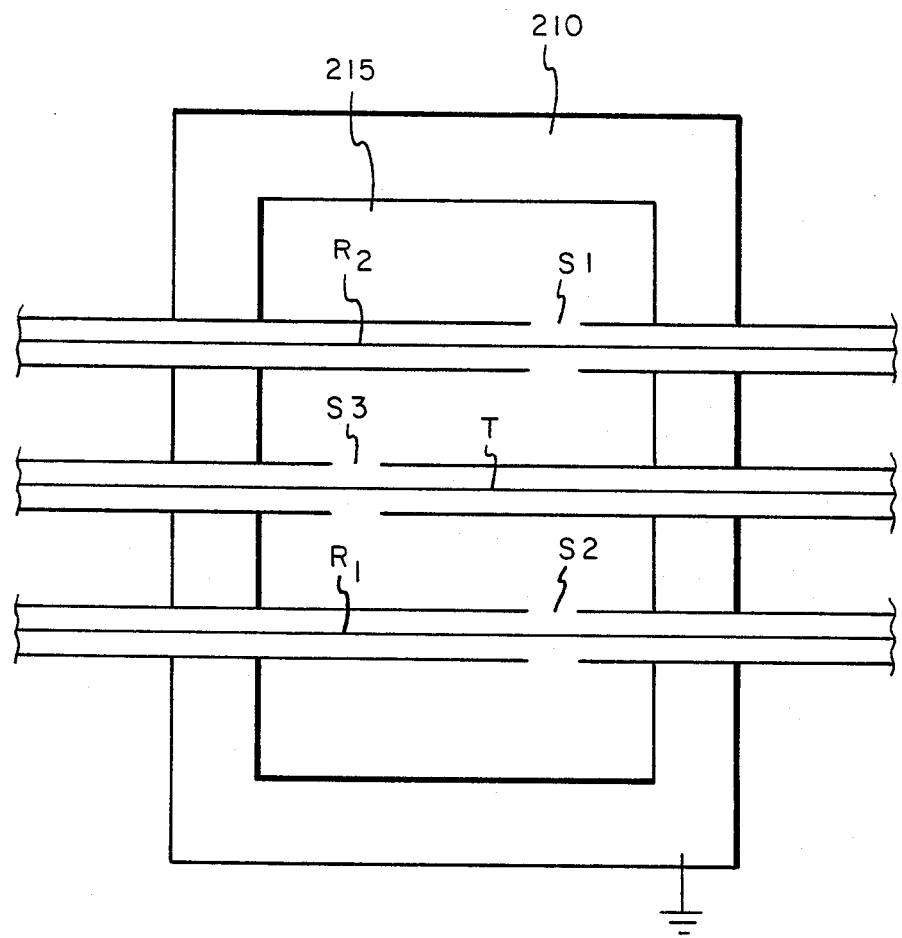
FIG. 21 is a cross-sectional view of an antenna set in accordance with an embodiment of the invention, employing electroquasistatic shields.

Referring to FIG. 21, there is shown an example of the type of shielding that can be utilized in conjunction with the antenna sets of the present invention. As described in the referenced copending prior applications, shields can be advantageously used in microinduction applications to reduce the deleterious effects of electroquasistatic coupling. In terms of the present invention, the shields can be employed in the slot in a form that can be visualized as extensions of coaxial outer conductors of the cables leading to the transmitter and receiver probes. The shields are slitted, as shown at S1, S2, and S3, to permit coupling of the magnetic field while minimizing electric field coupling. The electric field coupling is further reduced by having the slits in the receiver shields be at a position along the probe length that is different than the position of the slit in the transmitter shield. Appropriate shields can be utilized in any of the embodiments set forth.

The invention has been described in relation to particular preferred embodiments, but variations within the spirit and scope of the invention will occur to those skilled in the art. For example, it will be understood that any of the forms of the invention as set forth herein can be utilized in dipmeter logging devices, conductivity logging devices, dielectric permittivity logging devices, and any other devices in which the signals from the antenna sets as set forth can be usefully employed to obtain logging information. Also, as previously noted, the forms of the invention that deal with obtainment of a reference signal can be employed in various types of induction and microinduction logging devices wherein it is desirable to obtain a reference signal that is in a substantially known phase relationship with a component of a received signal. Finally, it will be recognized that features of the various embodiments hereof can be combined with features set forth in other embodiments hereof.

We claim:

1. Induction well logging apparatus for investigating formations surrounding a borehole, comprising:
   a body moveable in the borehole, said body having a face which is adapted for engagement with the borehole wall;
   an antenna set mounted in said face of said body and comprising: an electrically conductive base having a slot therein which opens toward the borehole wall, a plurality of conductive probes traversing said slot in a direction that is transverse the direction of a borehole radius through the slot, said probes respectively constituting a transmitting antenna and at least one receiving antenna;
   means for coupling an electronic energizing signal to said transmitting antenna probe to induce secondary currents in said surrounding formations; and
   means coupled to said at least one receiving antenna probe for generating an output signal dependent on the signal induced in said receiving antenna probe.

2. Apparatus as defined by claim 1, wherein said at least one receiving antenna probe comprises first and second receiving antenna probes.

3. Apparatus as defined by claim 2, wherein each of said probes comprises an extension of the center conductor of a coaxial conductor, and wherein each of said probes is terminated by shorting to one side of said slot.

4. Apparatus as defined by claim 2, wherein said receiver probes are electrically floating with respect to said base and are coupled together in series opposition after passing through said slot.

5. Apparatus as defined by claim 1, wherein said transmitter probe is electrically floating with respect to said base.

6. Apparatus as defined by claim 2, wherein said means coupled to said receiving antenna probes for generating an output signal includes an balanced/unbalanced transformer circuit coupled to said receiving antenna probes.

7. Apparatus as defined by claim 4, wherein said means coupled to said receiving antenna probes for generating an output signal includes a balanced/unbalanced transformer circuit coupled to said receiving antenna probes.

8. Apparatus as defined by claim 6, wherein said balanced/unbalanced transformer circuit has a primary winding having its opposite ends coupled to respective ends of said receiver probes, and a secondary winding across which a combined receiver signal is obtained.

9. Apparatus as defined by claim 7, wherein said balanced/unbalanced transformer circuit has a primary winding having its opposite ends coupled to respective ends of said receiver probes, and a secondary winding across which a combined receiver signal is obtained.

10. Apparatus as defined by claim 8, wherein said means for generating an output signal further comprises a phase-sensitive detector having a reference signal input and a measurement signal input, and means for coupling a center tap of said primary winding to said reference signal input and said secondary winding to said measurement signal input.

11. Apparatus as defined by claim 9, wherein said means for generating an output signal further comprises a phase-sensitive detector having a reference signal input and a measurement signal input, and means for coupling a center tap of said primary winding to said reference signal input and said secondary winding to said measurement signal input.

12. Apparatus as defined by claim 11 wherein the common coupling of said receiver probes is coupled to said base via an impedance having a value selected to adjust the phase of said reference signal to be in a predetermined phase relationship with the real component of the signal at said transformer secondary winding.

13. Apparatus as defined by claim 2, wherein said slot is filled with a dielectric material.

14. Apparatus as defined by claim 2, wherein said transmitting antenna probe is located between said receiving antenna probes.

15. Apparatus as defined by claim 14, wherein all of said probes are oriented substantially perpendicular to the direction of the borehole axis.

16. Apparatus as defined by claim 14 wherein said receiving antenna probes are spaced equidistant from said transmitting antenna probe.

17. Apparatus as defined by claim 14, wherein said receiving antenna probes are located at different distances from said transmitting antenna probe.

18. Apparatus as defined by claim 17, wherein said receiving antenna probes are positioned at respectively different distances from the bottom of the slot.

19. Apparatus as defined by claim 2, wherein said receiving antenna probes are positioned to one side of said transmitting antenna probe, and at respectively successively greater distances from said transmitting antenna probe.

20. Apparatus as defined by claim 19, wherein said receiving antenna probes are positioned at respectively different distances from the bottom of the slot.

21. Apparatus as defined by claim 2, wherein the bottom of said slot is asymmetrically contoured.

22. Apparatus as defined by claim 2, further comprising adjustable tuning means in said slot, including at least one tuning screw which extends into said slot to an adjustable extent.

23. Apparatus as defined by claim 1, further comprising a second antenna set, which is substantially the same as said first-mentioned antenna set, mounted in said body adjacent said first-mentioned antenna set.

24. Apparatus as defined by claim 23, wherein said antenna sets are mounted side-by-side in said body, and means are provided for operating both of said antenna sets as defined in claim 23.

25. Apparatus as defined by claim 1 further comprising conductive shielding means surrounding a portion of each probe and leaving a portion of each probe exposed, said reveiving antenna probes having positionally corresponding exposed portions, and said transmitting antenna having an exposed portion that does not positionally correspond to said receiving antenna exposed portions.

26. Induction well logging apparatus for investigating formations surrounding a borehole, comprising:
a body moveable in the borehole, said body having a face which is adapted for engagement with the borehole wall;
a transmitting antenna in said body;
means for electronically energizing the transmitting antenna to induce secondary currents in said surrounding formations;
a receiving antenna set mounted in said face of said body and comprising: an electrically conductive base having a slot therein which opens toward the borehole wall, first and second spaced conductive receiver probes traversing said slot in a direction that is transverse the direction of a borehole radius through the slot, said probes constituting a pair of receiving antennas, said first and second probes being electrically isolated from said base and being coupled together in series opposition;
means connected to the uncoupled ends of said first and second probes for generating an output signal dependent on the signals induced in said first and second probes.

27. Apparatus as defined by claim 26, wherein said first and second receiver probes comprise extensions of the center conductors of respective sections of coaxial cables.

28. Apparatus as defined by claim 26, wherein said transmitting antenna comprises a transmitting antenna probe traversing said slot and being electrically isolated from said base.

29. Apparatus as defined by claim 26, wherein said means connected to the uncoupled ends of said first and second probes for generating an output signal includes a balanced/unbalanced transformer circuit.

30. Apparatus as defined by claim 29, wherein said balanced/unbalanced transformer circuit has a primary winding having its opposite ends coupled to respective ends of said receiver probes, and a secondary winding across which a combined receiver signal is obtained.

31. Apparatus as defined by claim 30, wherein said means for generating an output signal further comprises a phase-sensitive detector having a reference signal input and a measurement signal input, and means for coupling a center tap of said primary winding to said reference signal input and said secondary winding to said measurement signal input.

32. Well logging apparatus for investigating formations surrounding a borehole, comprising:
 a body moveable in the borehole, said body having a face which is adapted for engagement with the borehole wall;
 a transmitting antenna mounted in said wall-engaging face of said body for transmitting electromagnetic energy into said formation;
 a receiver array, for receiving said electromagnetic energy, mounted in said wall-engaging face of said body and spaced from said transmitting antenna, said receiver array comprising: a conductive base having a slot therein which opens toward the borehole wall, and a plurality of spaced parallel conductive probes traversing the slot in a direction that is transverse the direction of a borehole radius through the slot;
 means for coupling an electronic energizing signal, to said transmitting antenna; and
 means coupled to the probes of said receiver array for generating an output signal.

33. Apparatus as defined by claim 32, wherein each of said probes comprises and extension of the center conductor of a coaxial conductor, and wherein each of said probes is terminated by shorting to one side of said slot.

34. Induction well logging apparatus for investigating the conductivity of formations surrounding a borehole, comprising:
 a device moveable in the borehole, said device having at least one pad which is adapted for engagement with the borehole wall;
 an antenna set mounted in said pad and comprising: an electrically conductive base having a slot therein which opens toward the borehole wall, three conductive probes traversing said slot in a direction that is transverse the direction of a borehole radius through the slot, said probes respectively constituting a transmitting antenna and a pair of receiving antennas;
 means for coupling an electronic energizing signal to said transmitting antenna probe to induce secondary currents in said surrounding formations; and
 means coupled to said receiving antenna probes for generating an output signal which depends on the signals induced in said receiving antenna probes.

35. Apparatus as defined by claim 34, wherein said device has a plurality of pads adapted for engagement with the borehole wall, each of said pads having an antenna set as defined and operated in claim 34.

36. Apparatus as defined by claim 1, further comprising: a second antenna set, which is substantially the same as said first-mentioned antenna set, mounted in said body at a different vertical position than said first-mentioned antenna set such that said antenna sets are at different depth levels in the borehole; means for transmitting propagating electromagnetic energy from a transmitting antenna of one of said antenna sets; and means for measuring the propagating electromagnetic energy received at the receiving antennas of the other antenna set.

* * * * *